Nov. 30, 1926.
L. A. HAAS ET AL
1,608,735
METHOD FOR MAKING RADIATOR CORES
Filed Feb. 24 1925
2 Sheets-Sheet 2
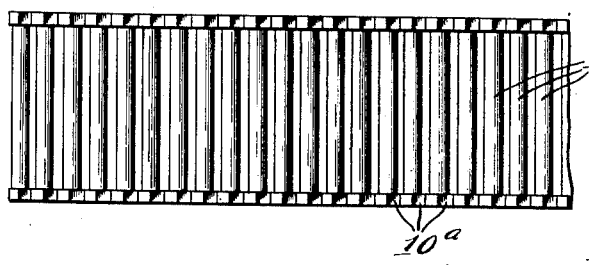
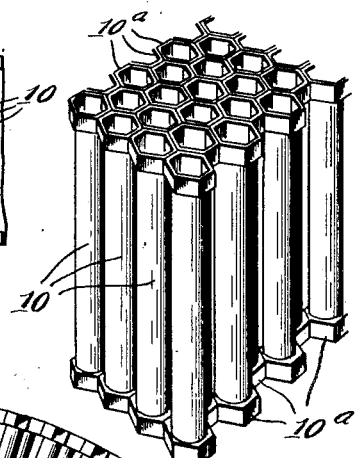
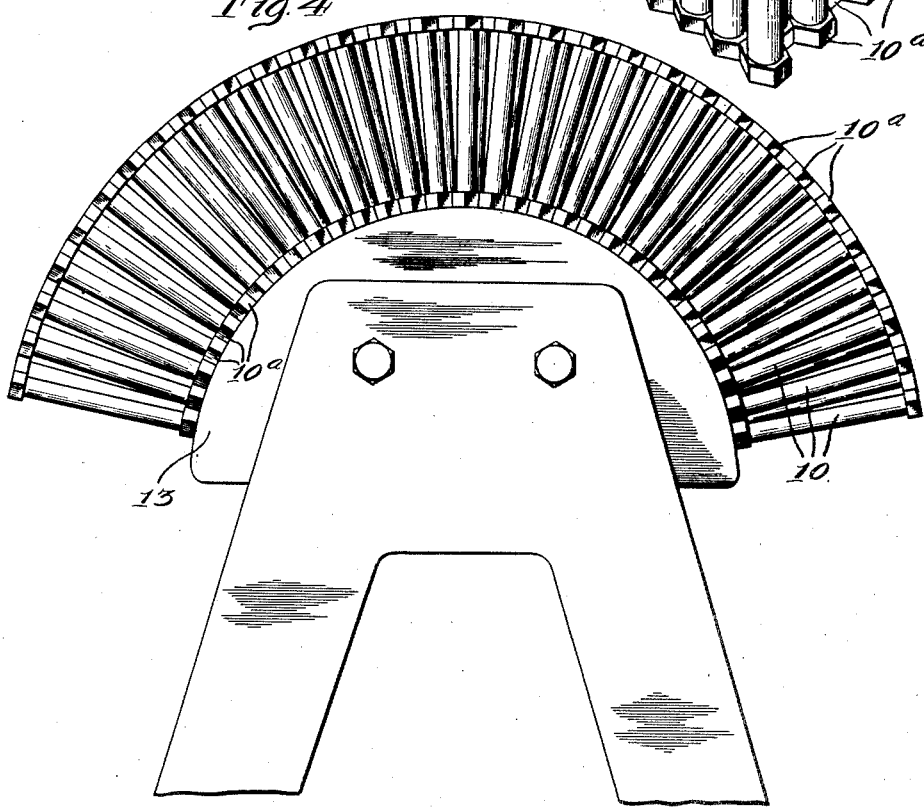
Inventors
Louis Andrew Haas
William John Haas
By Bradbury & Caswell
Attorneys Patented Nov. 30, 1926.

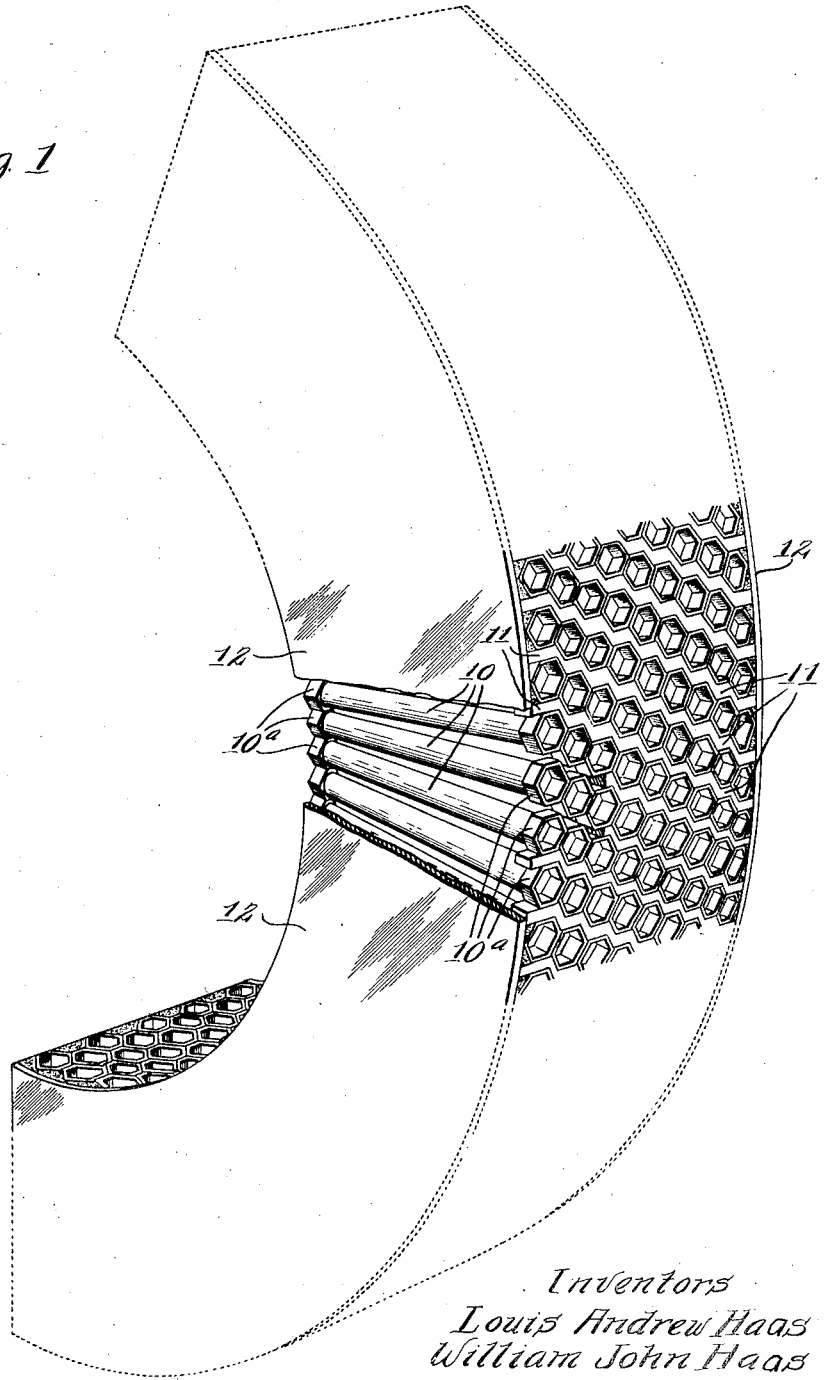

1,608,735

UNITED STATES PATENT OFFICE.

LOUIS ANDREW HAAS AND WILLIAM JOHN HAAS, OF ST. PAUL, MINNESOTA.

METHOD FOR MAKING RADIATOR CORES.

Application filed February 24, 1925. Serial No. 11,103.

Our invention relates to improvements in methods for making radiator cores of the cartridge type constructed in ring-like or hollow cylindrical form or segmental part of either.

The prime object of this invention is to provide an improved method for making radiator cores of the character noted, whereby such cores may be produced in quantity and in workmanlike manner at minimum labor, material and equipment costs.

In the drawings, Fig. 1 represents, in dotted and solid lines, a segmental form of radiator core of the type adapted for construction under our improved method, the illustration in solid lines being limited to avoid unnecessary duplication of lines in the disclosure; Fig. 2 is a fragmentary elevational view of a cartridge or tube assembly before it is bent into segmental form in the process of completing the structure shown in Fig. 1; Fig. 3 is a perspective illustration of a portion of the structure shown in Fig. 2 and Fig. 4 is an elevational view of a tube or cartridge assembly showing the same shaped segmentally over a curved form.

Referring to Fig. 1 of drawings, it will be seen that the illustrated radiator core is annular in form and comprises an assemblage of cartridges or tubes 10 disposed radially of the axis of the tube assembly. The tubes 10 are identical, each end of each tube being expanded to form an hexagonal head 10ª and said tubes are disposed in rows diagonally of the axis of the structure. The inner heads 10ª of the tubes 10 are soldered together face to face, as shown at the lower part of Fig. 1, the inner concave wall of the structure, formed by said inner heads, being sealed in the soldering process. The diagonal rows of tubes 10 are spread apart at the outer ends of said tubes, the adjacent faces of the heads 10ª in each row contacting one with the other. Spacing keeper strips 11 having zigzag form are inserted between the outer heads 10ª of the rows of tubes 10 and conform with the non-contacting faces of said heads 10ª, said strips being soldered to said faces to join the outer ends of the tubes 10 and to seal the convex wall formed by the outer heads 10ª and strips 11. Segmental wall plates 12, disposed against opposite faces of the tube assembly, are soldered at their margins to the heads 10ª of the outermost tubes 10 and to the extremities of the spacing keepers 11.

In forming the annular core, we assemble a multiplicity of the tubes 10 and hold the same together with the heads 10ª thereof disposed face to face as seen in Fig. 3. Taking the tube assembly, thus provided, we dip one side thereof in a bath of solder substantially to the depth of the heads 10ª at that side and thereby not only join the tubes 10 together, but seal the wall of the tube assembly formed by said heads. Choosing a convex form of the desired radius as at 13, Fig. 4, the treated side of the tube assembly is applied thereto, said assembly being bent over the form and given an annular shape, as seen in Fig. 4, wherein the tubes 10 take positions radially of the axis of the form, said tubes 10 spreading apart at their upper ends, row from row, as seen in Figs. 1 and 4. The spacing keeper strips 11, are then inserted between the diagonal rows of tubes and the convex wall of the tube assembly dipped in a bath of solder substantially to the depth of the outer heads 10ª. Said last step not only secures the outer heads 10ª of the tubes 10 to each other and to said strips 11, but seals the convex wall of the structure formed by said outer heads 10ª and strips 11.

It will be seen that the joinder of the inner heads 10ª of the tubes 10 and the sealing of the inner concave wall would not be possible in a simple dipping process were it not for the fact that the dipping of said ends is accomplished prior to the formation of the tube assembly in annular shape and, for this reason, it will be understood that the present described method of forming an annular, cartridge radiator core makes possible the commercial production thereof and insures uniformity and efficiency in manufacture and in the ultimate product.

After the convex wall is completed in the second dipping step, the wall plates 12 are soldered in any convenient manner to the heads 10ª of the tubes 10 at the sides of the assembly.

It will be understood that in the instant method, we contemplate the application of wall plates to the ends of a segmental structure in lieu of wall plates at the sides thereof and, further, that the method may be employed to form ring-like and cylindrical tube assemblies.

Having described our invention, what we claim as new and desire to protect by Letters Patent is:

1. The method of forming an annular radiator core consisting in first assembling a plurality of similar tubes with the ends thereof co-planar at either side of the assembly, then dipping one side of the tube assembly to seal together the ends of the tubes at that side thereof, then bending said treated side of the assembly over a convex form and then dipping the other side of the tube assembly, convexed in said bending process, to seal together the ends of the tubes at said latter side of said assembly.

2. The method of forming an annular radiator core consisting in first grouping a plurality of similar tubes with the ends co-planar at either side of the assembly, then dipping one side of the assembly to seal the ends of the tubes together at said dipped side, then bending the assembly over a convex form with said treated side next to said form, then inserting spacing keepers between the free ends of said tubes separated in the bending process, and then dipping the convexed side of the assembly to join said tubes and keepers and to seal that side of said assembly.

3. The method of forming an annular radiator core consisting in first grouping a plurality of tubes with the ends thereof co-planar at either side of the assembly, the arrangement of said tubes being effected to dispose the same in diagonal rows, then dipping one side of the assembly in a soldering fluid to join the ends of the tubes and to seal said dipped side, then bending the assembly over a convex surface with said treated side next thereto to give annular form to the assembly, then inserting spacer keepers between the rows of tubes, diagonally separated in the bending process, and then dipping the convexed, keeper equipped side of the assembly in a soldering fluid to join the tubes and keepers and to seal said side of the assembly.

4. The method of forming an annular radiator core consisting in first grouping a plurality of similar, hexagonally headed tubes with the heads co-planar at either side of the assembly, then dipping one side of the assembly in a bath of solder substantially to the depth of said heads to seal the same together, then bending the assembly over a form with said dipped side next thereto, then inserting spacing keeper strips between the rows of outer heads, and then dipping the convexed side of the assembly in a bath of solder, substantially to the depth of the outer heads, to seal said heads and strips together.

5. The method of forming an annular radiator core consisting in first assembling a plurality of similar tubes with the ends thereof co-planar at either side of the assembly, then dipping one side of the tube assembly to seal together the ends of the tubes at that side thereof, then bending said treated side of the assembly over a convex form, then dipping the convexed side of the tube assembly to seal together the ends of the tubes at said latter side and then applying wall plates to the tubes at other faces of the tube assembly.

6. The method of forming an annular radiator core consisting in first grouping a plurality of similar tubes with the ends co-planar at either side of the assembly, then dipping one side of the assembly to seal the ends of the tubes together at said dipped side, then bending the assembly over a convex form with said treated side next to said form, then inserting spacing keepers between the free ends of said tubes separated in the bending process, then dipping the convexed side of the assembly to join said tubes and keepers and to seal that side of said assembly and then soldering plates to the tubes and spacing keepers at other faces of the tube assembly.

In testimony whereof, we have signed our names to this specification.

LOUIS ANDREW HAAS.
WILLIAM JOHN HAAS.